(12) United States Patent
Lewczynski et al.

(10) Patent No.: US 10,076,945 B2
(45) Date of Patent: Sep. 18, 2018

(54) AIR CONDITIONER HAVING TUNNEL

(71) Applicants: DENSO International America, Inc., Southfield, MI (US); DENSO CORPORATION, Kariya, Aichi-pref. (JP)

(72) Inventors: Ian Lewczynski, Brownstown, MI (US); Nicholas Mazzocco, Clawson, MI (US)

(73) Assignees: DENSO International America, Inc., Southfield, MI (US); DENSO CORPORATION, Kariya, Aichi-pref. (KR)

( * ) Notice: Subject to any disclaimer, the term of this patent is extended or adjusted under 35 U.S.C. 154(b) by 219 days.

(21) Appl. No.: 15/003,963

(22) Filed: Jan. 22, 2016

(65) Prior Publication Data

US 2017/0210197 A1    Jul. 27, 2017

(51) Int. Cl.
*F25B 27/00* (2006.01)
*B60H 1/00* (2006.01)
*B60H 1/32* (2006.01)

(52) U.S. Cl.
CPC ..... *B60H 1/00564* (2013.01); *B60H 1/00007* (2013.01); *B60H 1/3202* (2013.01)

(58) Field of Classification Search
CPC ................ B60H 1/0007; B60H 1/3202; B60H 2001/00135; B60H 1/00564
See application file for complete search history.

(56) References Cited

U.S. PATENT DOCUMENTS

| | | | |
|---|---|---|---|
| 2006/0144582 A1* | 7/2006 | Sekiya | B60H 1/00692 165/202 |
| 2010/0248608 A1 | 9/2010 | Belanger | |
| 2012/0273160 A1* | 11/2012 | Hipp-Kalthoff | B60H 1/00378 165/42 |
| 2015/0202941 A1* | 7/2015 | Yamamoto | B60H 1/00064 62/238.1 |

\* cited by examiner

*Primary Examiner* — Elizabeth Martin

(57) ABSTRACT

An evaporator and a heater may be accommodated in a case. A tunnel in a tubular shape forms a tunnel passage. The case may form an evaporator passage and a heater passage. The evaporator passage may be located on a downstream side of the evaporator and extended without passing through the heater. The heater passage may be located on a downstream side of the heater. The tunnel may extend from the heater passage through the evaporator passage toward an inner wall of the case.

14 Claims, 10 Drawing Sheets

FIG. 1
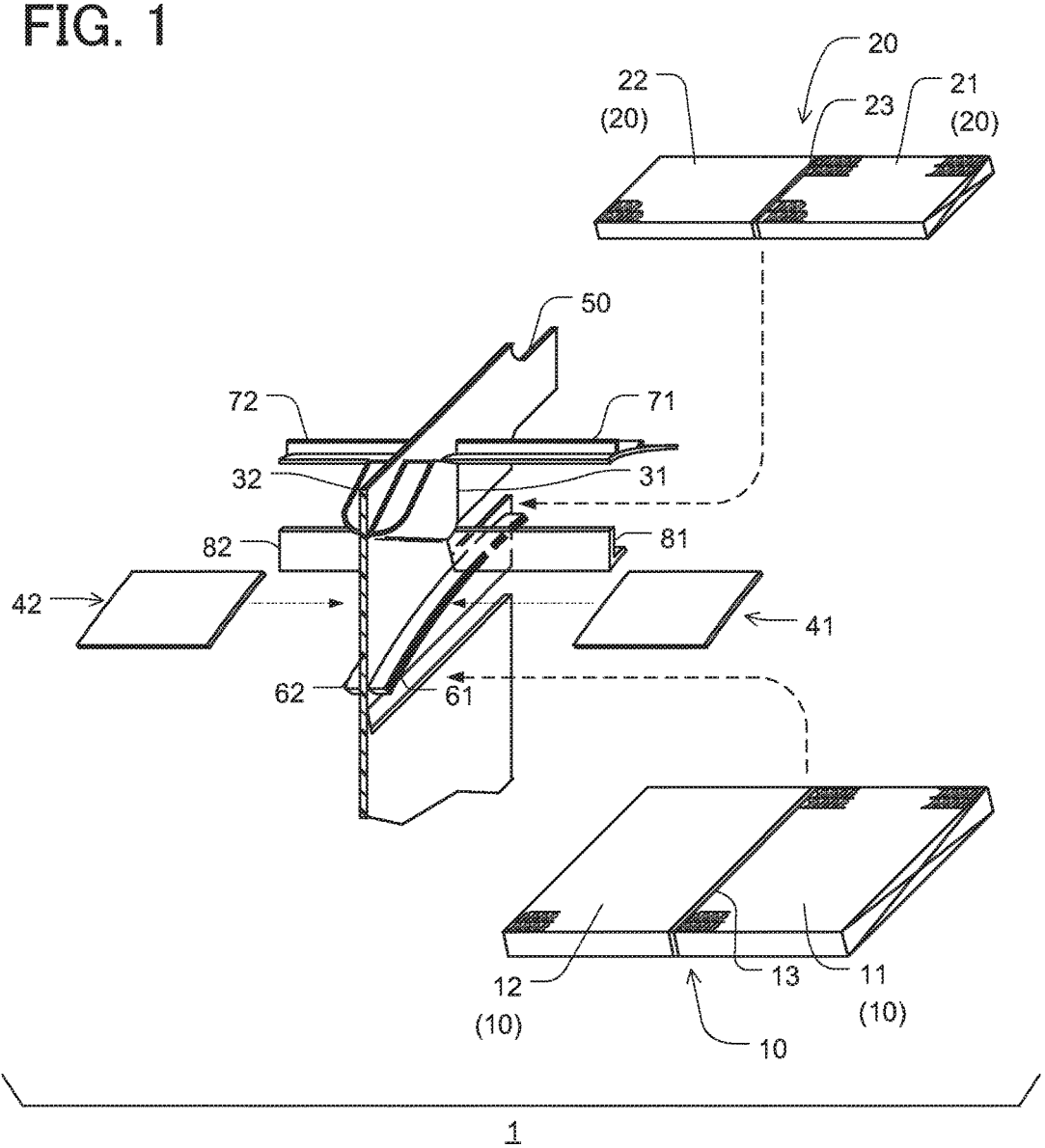
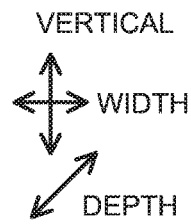

FIG. 5
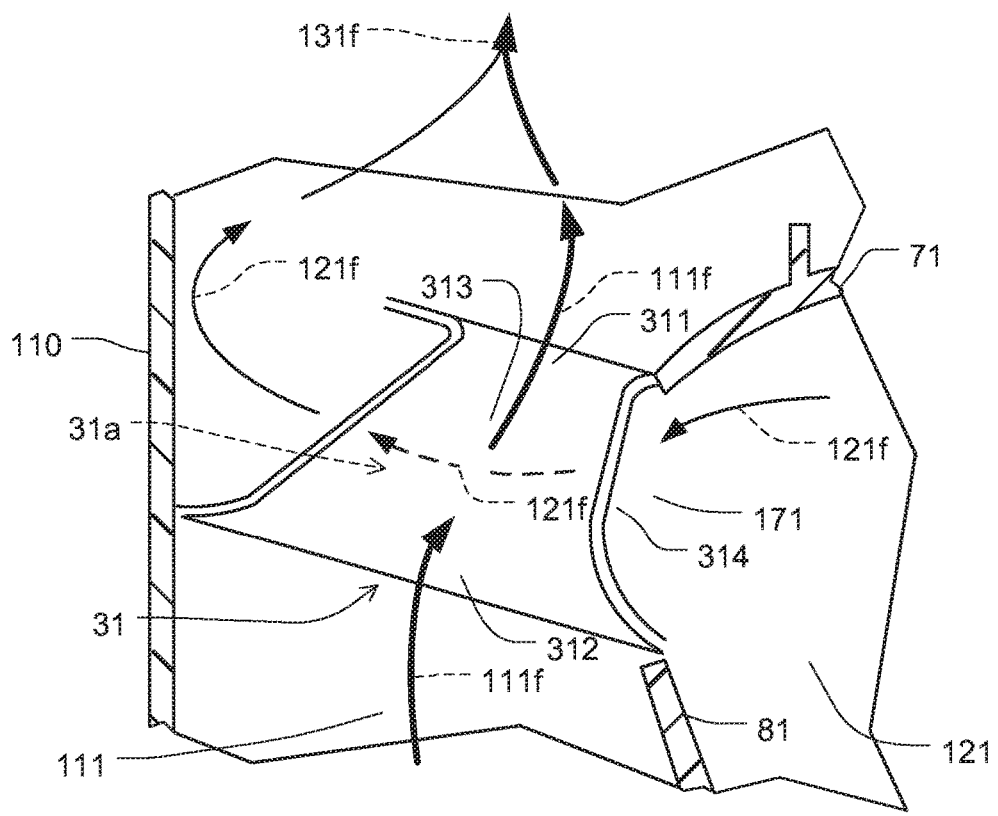
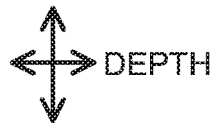

AIR CONDITIONER HAVING TUNNEL

TECHNICAL FIELD

The present disclosure relates to an air conditioner having a tunnel.

BACKGROUND

An air conditioner may include an evaporator to cool air and a heater to heat air. Air after passing through the heater may be mixed with air after passing through the evaporator to control temperature od air discharged from the air conditioner. It may be desirable to reduce temperature distribution in discharged air.

SUMMARY

According to an aspect of the disclosure, an evaporator may be accommodated in the case. A heater may be accommodated in the case. A tunnel may be in a tubular shape forming a tunnel passage. The case may form an evaporator passage and a heater passage. The evaporator passage may be located on a downstream side of the evaporator and may be extended without passing through the heater. The heater passage may be located on a downstream side of the heater. The tunnel may extend from the heater passage through the evaporator passage toward an inner wall of the case.

BRIEF DESCRIPTION OF THE DRAWINGS

The above and other objects, features and advantages of the present invention will become more apparent from the following detailed description made with reference to the accompanying drawings. In the drawings:

FIG. 1 is an exploded perspective view showing components of an air conditioner of a first embodiment;

FIG. 5 is an enlarged side view showing the tunnel;

DETAILED DESCRIPTION (First Embodiment)

Figure 2:
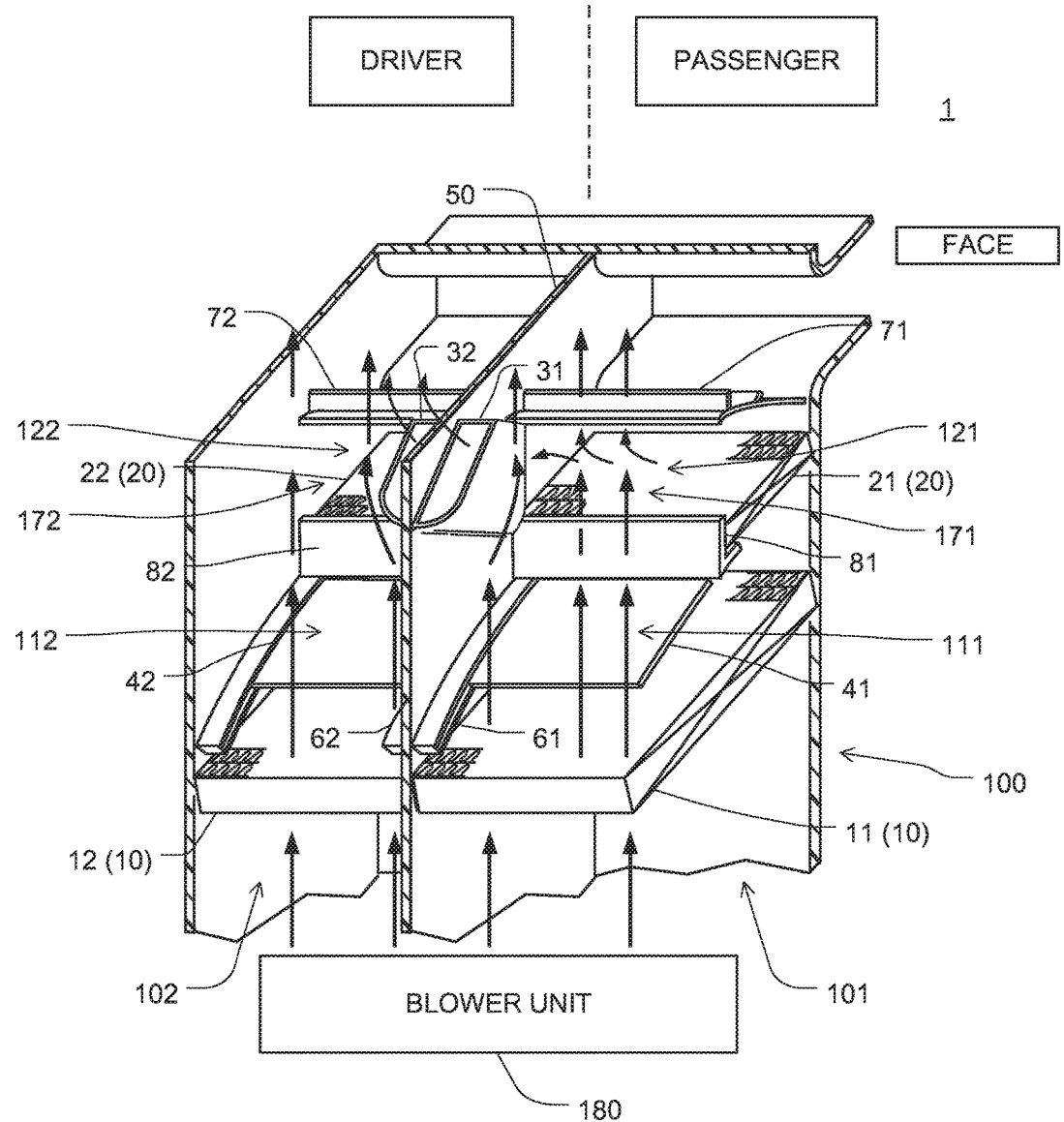
FIG. 2 is a perspective sectional view showing the air conditioner.

As follows, a first embodiment of the present disclosure will be described with reference to drawings. In the description, a vertical direction is along an arrow represented by "VERTICAL" in drawing(s). A width direction is along an arrow represented by "WIDTH" in drawing(s). A depth direction is along an arrow represented by "DEPTH" in drawing(s).

FIG. 1 shows components of a heating and ventilating air conditioner (HVAC) 1.

An evaporator 10 may be a fin-and-tube heat exchanger. The fin-and-tube heat exchanger may include an evaporator core, which includes tubes and the fins stacked alternately one another, and tanks equipped to both ends of the evaporator core and communicated with the tubes to flow a refrigerant therethrough. The evaporator 10 may be connected with a refrigerant cycle to flow refrigerant therethrough. The evaporator core may have an inner partition 13, which partitions the evaporator core into a first evaporator section 11 and a second evaporator section 12.

A heater 20 may be a fin-and-tube heat exchanger, similarly to the evaporator 10. The heater 20 may be connected with a water pipe connected with an internal combustion engine and a water pump to flow water therethrough. The heater core may have an inner partition 23, which partitions the heater core into a first heater section 21 and a second heater section 22.

A partition 50 may be a plate-shaped member formed by, for example, resin molding. The partition 50 may have a slit in which the evaporator 10 is inserted, such that the inner partition 13 of the evaporator 10 is aligned with the partition 50. The partition 50 may have another slit in which the heater 20 is inserted, such that the inner partition 23 of the heater 20 is aligned with the partition 50. The partition 50 may have first and second rails 61 and 62 on both sides. The first and second rails 61 and 62 may be equipped with first and second heater doors 41 and 42, respectively. Each of the first and second heater doors 41 and 42 may be in a curved plate shape. The partition 50 may have first and second deflectors 71 and 72 on both sides. The first and second deflectors 71 and 72 may extend from both sides of the partition 50 in opposite directions. Each of the first and second deflectors 71 and 72 may be in a curved plate shape. The partition 50 may have first and second heater walls 81 and 82 on both sides. The first and second heater walls 81 and 82 may extend from both sides of the partition 50 in opposite directions. Each of the first and second heater walls 81 and 82 may be in an L-shaped plate shape. The first and second deflectors 71 and 72 and the first and second heater walls 81 and 82 may be integrally formed with the partition 50 or may be separately formed and fitted to the partition 50. The partition 50 may have first and second tunnels 31 and 32 on both sides. Each of the first and second tunnels 31 and 32 may be in a tubular shape forming a through hole extending along main surfaces of the partition 50. The first and second tunnels 31 and 32 may be integrally formed with the partition 50 by resin molding by using a slidable core, which is movable relative to molding dies to form the through holes in the first and second tunnels 31 and 32.

The partition 50 equipped with the evaporator 10, the heater 20, the heater doors 41 and 42, the deflectors 71 and 72, and the heater walls 81 and 82 may be accommodates in a case 100. The partition 50 may partition an interior of the case 100 into a first compartment 101 and a second compartment 102. The first evaporator section 11 and the first heater section 21 may be located in the first compartment 101, and the second evaporator section 12 and the second heater section 22 may be located in the second compartment 102.

The first rail 61 of the partition 50 may support the first heater door 41 with a rail of the case 100, such that the first heater door 41 is movable along the first rail 61. The second rail 61 of the partition 50 may support the second heater door 42 with a rail of the case 100, such that the second heater door 42 may be movable along the second rail 61. The first heater door 41 and the second heater door 42 may be actuated with actuators individually via, for example, cams and linkages.

The first deflector 71 and the first heater wall 81 may be located in the first compartment 101. The first deflector 71 and the first heater wall 81 may be connected with the partition 50 at one ends and may be connected to an inner wall of the case 100 at the other ends. The first deflector 71 and the first heater wall 81 may form a first heater opening 171 therebetween. The second deflector 72 and the second heater wall 82 may be located in the second compartment 102. The second deflector 72 and the second heater wall 82 may be connected with the partition 50 at one ends and may be connected to an inner wall of the case 100 at the other ends. The second deflector 72 and the second heater wall 82 may form a second heater opening 172 therebetween.

The case 100 may be connected with a blower unit 180. The blower unit 180 may include a blower fan to cause airflow through the interior of the case 100. The partition 50 may split the airflow into a first airflow and a second airflow to pass through the first compartment 101 and the second compartment 102, respectively.

The arrows show the first airflow and the second airflow caused by the blower unit 180 to pass through the first compartment 101 and the second compartment 102, separately. The evaporator 10, the heater 20 door, and the heater 20 may be located in this order along a direction of the airflows.

The first airflow may pass through the first evaporator section 11 and the first heater section 21 within the first compartment 101. The first heater door 41 controls a quantity of the first airflow passing through the first heater section 21. The first heater wall 81 may be located on the downstream side of the first heater section 21 to partition the first compartment 101 into a first evaporator passage 111 and a first heater passage 121. The first heater passage 121 may be located on a downstream side of the first heater section 21 to conduct airflow after passing through the first heater section 21. The first evaporator passage 111 may be located on the downstream side of the first evaporator section 11 and may be extended without passing through the first heater section 21. The first evaporator passage 111 may conduct airflow after passing through the first evaporator section 11 to bypass the first heater section 21. The first deflector 71 may be located on the downstream side of the first heater section 21 to deflect the first airflow after passing through the first heater section 21 toward the first evaporator passage 111 and partially toward the first tunnel 31. The airflow deflected along the first deflector 71 may be directed toward the airflow passing in the first evaporator passage 111, and the airflows may be mixed together. In this way, the first airflow may be conditioned through the first evaporator section 11 and the first heater section 21 and may be directed toward a driver's area.

The second airflow may pass through the second evaporator section 12 and the second heater section 22 within the second compartment 102. The second heater door 42 controls a quantity of the second airflow passing through the second heater section 22. The second heater wall 82 may be located on the downstream side of the second heater section 22 to partition the second compartment 102 into a second evaporator passage 112 and a second heater passage 122. The second heater passage 122 may be located on a downstream side of the second heater section 22 to conduct airflow after passing through the second heater section 22 toward the second heater opening 172. The second evaporator passage 112 may be located on the downstream side of the second evaporator section 12 and may be extended without passing through the second heater section 22. The second evaporator passage 112 may conduct airflow after passing through the second evaporator section 12 to bypass the second heater section 22. The second deflector 72 may be located on the downstream side of the second heater section 22 to deflect the second airflow after passing through the second heater section 22 toward the second evaporator passage 112 and partially toward the second tunnel 32. The airflow deflected along the second deflector 72 may be directed toward the airflow passing in the second evaporator passage 112, and the airflows may be mixed together. In this way, the second airflow may be conditioned through the second evaporator section 12 and the second heater section 22 and may be directed toward a passenger's area.

As described above, the first airflow and the second airflow may be cooled through the evaporator 10 and heated through the heater 20, separately. Thus, the conditioned first airflow may be conducted toward the driver's area, and the conditioned second airflow may be conducted toward the passenger's area, separately. In the present configuration, the partition 50 may function to restrict airflow from causing crosstalk (leakage) between the first compartment 101 and the second compartment 102.

The first compartment 101 and the second compartment 102 may have equivalent configurations and may be separately and individually manipulated to supply conditioned air in different states separately to the driver's area and the passenger's area.

As follows, a peripheral structure of the tunnel will be described. In the subsequent description, the configuration of the first compartment 101 will be described as a representative example, and notation of the first and second will be omitted.

Figure 3:
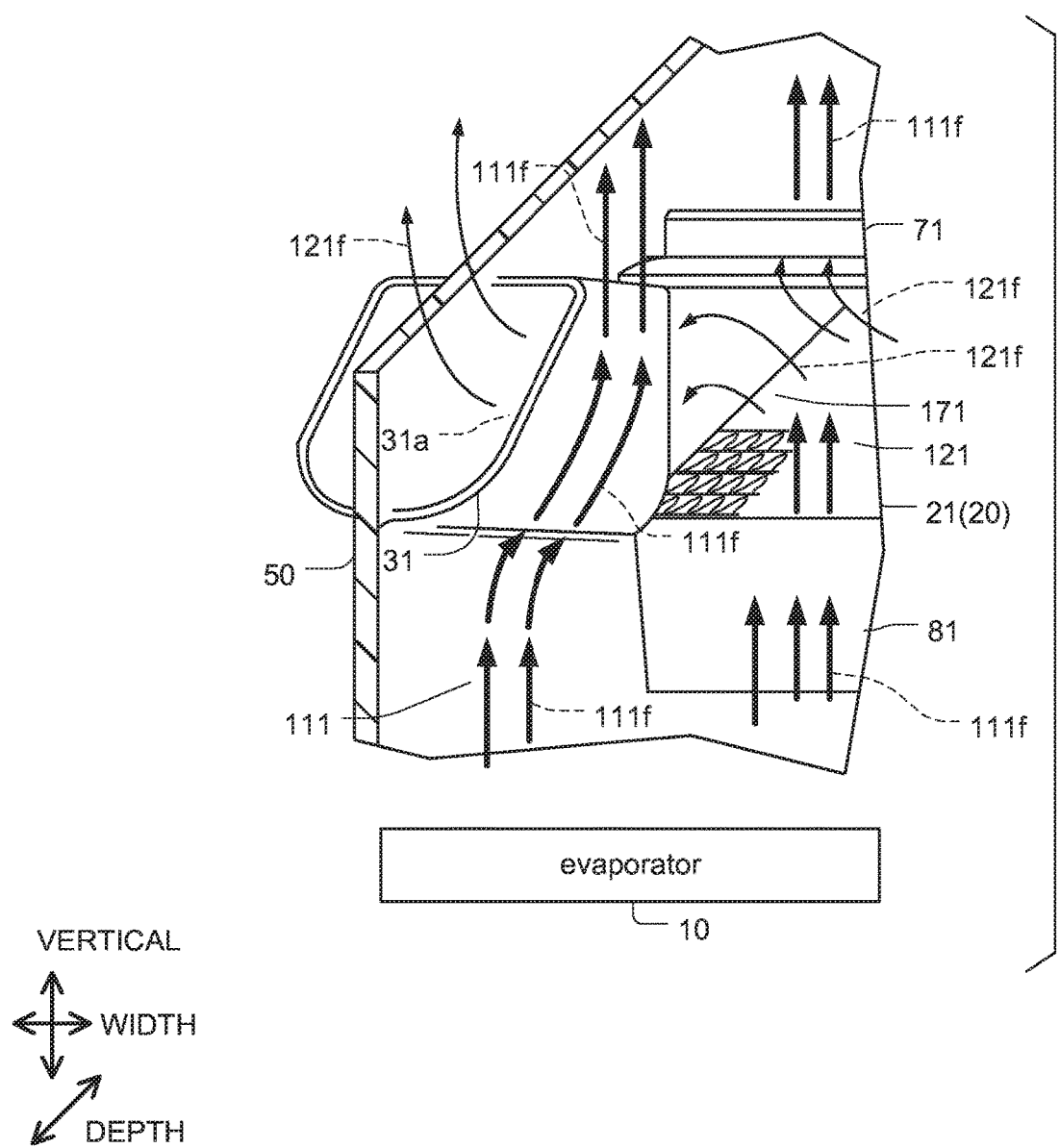
FIG. 3 is an enlarged perspective view showing tunnels of the air conditioner.

In FIG. 3, the tunnel 31 may be raised from the partition 50 in the width direction and may be protruded into the evaporator passage 111 to form a tunnel passage 31a therein. The tunnel passage 31a may be located adjacent to the evaporator passage 111.

The airflow passing through the evaporator passage 111 forms an evaporator airflow 111f. On the left side in the drawing, the evaporator airflow 111f from the evaporator 10 may pass upward in the vertical direction along the surface of the partition 50. The evaporator airflow 111f may be deflected on the surface of the tunnel 31 gently outward. Subsequently, the evaporator airflow 111f again starts to pass upward in the vertical direction. On the right side in the drawing, the evaporator airflow 111f from the evaporator 10 may pass upward in the vertical direction linearly without colliding with the tunnel 31.

The airflow passing through the heater passage 121 forms a heater airflow 121f. The tunnel 31 may split the heater airflow 121f to move into the tunnel passage 31a and the evaporator passage 111. On the left side in the drawing, the heater airflow 121f from the heater 20 may be deflected along the inner surface of the deflector 71 toward the tunnel 31. The deflected heater airflow 121f may pass through the tunnel passage 31a without interfering with the evaporator airflow 111f. Subsequently, the heater airflow 121f moves out of the tunnel passage 31a to merge with the evaporator airflow 111f. On the right side in the drawing, the heater airflow 121f from the heater 20 may be also deflected along the inner surface of the deflector 71 toward the heater opening 171 between the deflector 71 and the heater wall 81. The deflected heater airflow 121f may pass through the heater opening 171 to move into the evaporator passage 111.

Thus, the heater airflow 121*f* merges with the evaporator airflow 111*f* outside the heater opening 171.

Figure 4:
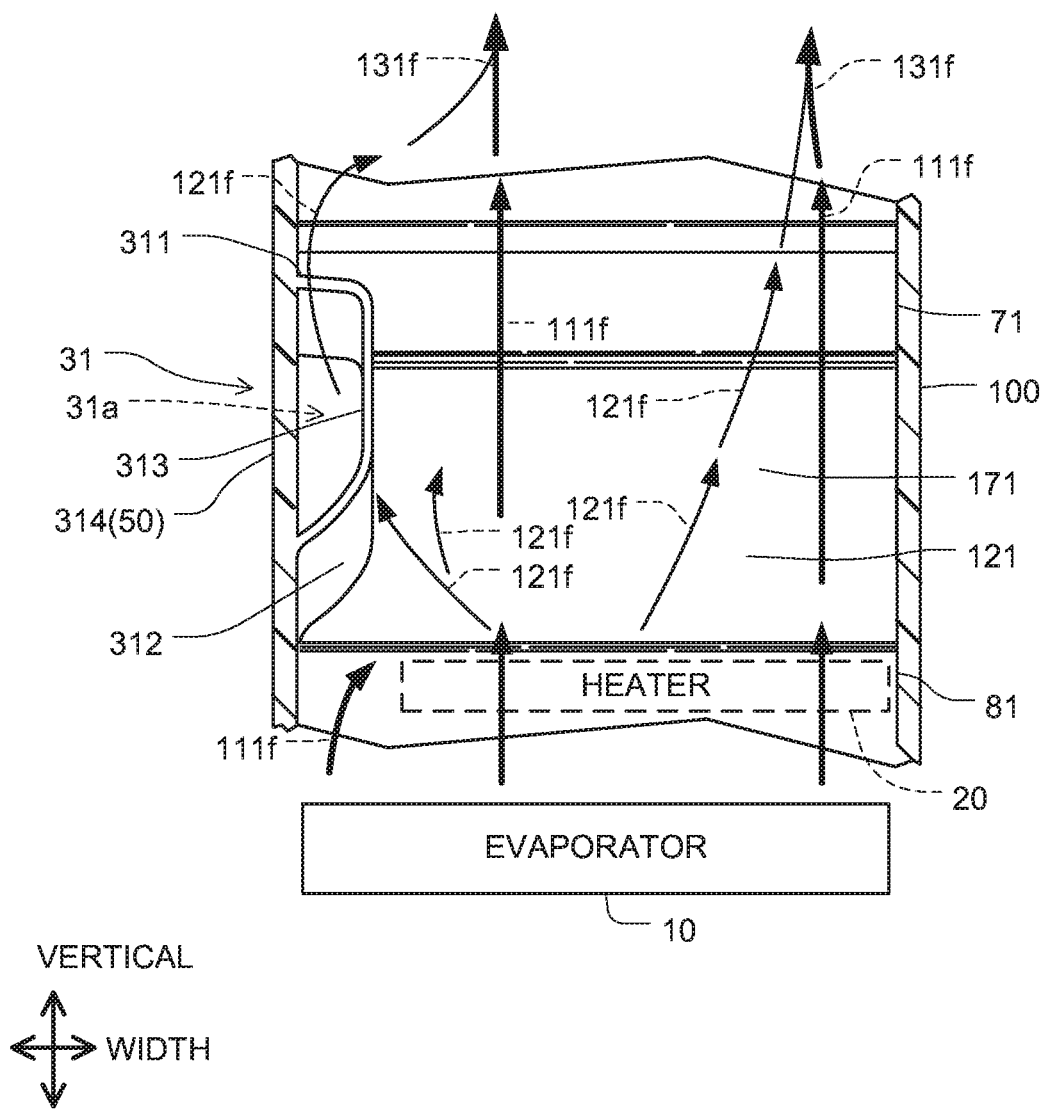
FIG. 4 is an enlarged front view showing the tunnel.

In FIG. 4, the tunnel 31 may have an upper wall 311, a lower wall 312, a top wall 313 and a bottom wall 314, which may be integrated into one piece to form a tubular structure. The bottom wall 314 may be a part of the partition 50. The upper wall 311 and the lower wall 312 may be raised from the bottom wall 314. The top wall 313 may bridge the upper wall 311 with the lower wall 312. The tunnel 31 may have an internal space forming the tunnel passage 31*a*. The upper wall 311, the lower wall 312, and the top wall 313 may partition the tunnel passage 31*a* from the evaporator passage 111. Thus, the tunnel 31 may isolate a part of the heater airflow 121*f*, which passes through the tunnel passage 31 a, from the evaporator airflow 111*f*.

The lower wall 312 and the upper wall 311 may at acute angles relative to the bottom wall 314 such that the tunnel passage 31*a* may have a trapezoidal cross section. The lower wall 312 may be at a lower angle, i.e., less tilted than the upper wall 311 to form a deflecting surface to gently deflect the evaporator airflow 111*f*. The tunnel 31 may protrude from the partition 50 to have a tunnel height from the partition 50. The rail 61 (FIG. 2) may protrude from the partition 50 to have a rail height from the partition 50. The tunnel height may be less than the rail height.

In FIG. 5, the tunnel 31 may extend linearly from the heater opening 171 toward the left upper side in the drawing, such that the tunnel 31 may intersect with the evaporator passage 111. The tunnel 31 may have an inlet directed toward the heater opening 171. The tunnel 31 may have an outlet directed toward the inner wall 110 of the case 100. The tunnel 31 may be inclined upward toward the downstream side of the evaporator airflow 111*f*.

As described above, the heater airflow 121*f* after passing though the heater passage 121 may be deflected on the deflector 71 and may be directed toward the heater opening 171. The heater airflow 121*f* may be divided by the tunnel 31 into a part of the heater airflow 121*f* to pass through the tunnel passage 31*a*. The part of the heater airflow 121*f* may pass through the tunnel 31 to intersect with the evaporator airflow 111*f* without merging with the evaporator airflow 111*f*. Thus, the part of the heater airflow 121*f* may be directed toward the inner wall 110 of the case 100 while maintaining its velocity and dynamic pressure. The tunnel passage 31*a* may be slightly inclined upward to direct the heater airflow 121*f* passing therethrough toward the inner wall 110 of the case 100 at an angle. Thus, the heater airflow 121*f* after passing through the tunnel 31 may collide against the inner wall 110 to change its flow direction upward to move along with the evaporator airflow 111*f*. Thus, the heater airflow 121*f* may merge with the evaporator airflow 111*f* to form a mixed airflow 131*f* on the downstream side of the tunnel 31.

Figure 6:
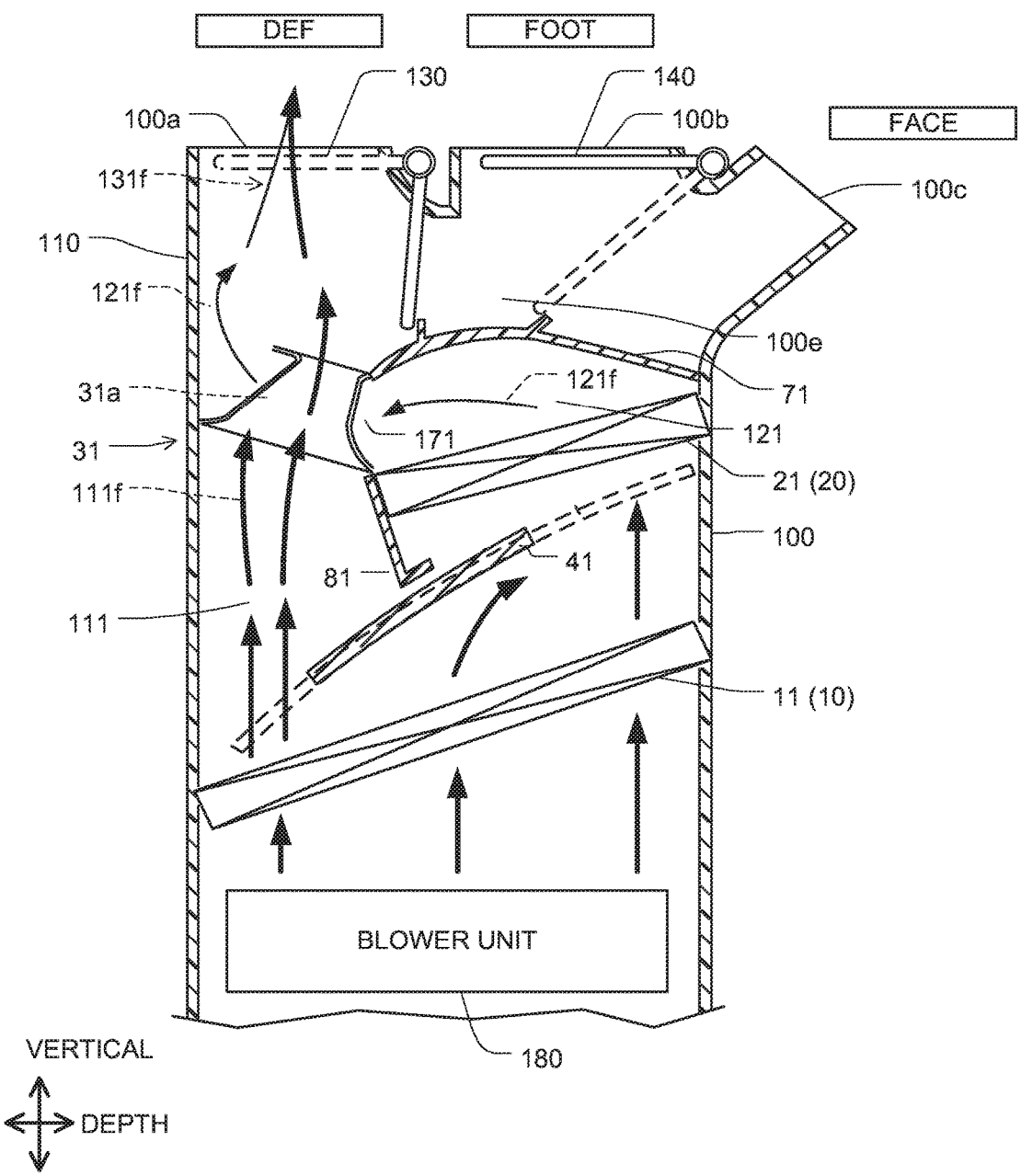
FIG. 6 a sectional view showing the air conditioner in a DEF mode.

As shown in FIG. 6, the case 100 may have a defroster outlet 100*a*, a foot outlet 100*b*, and a face outlet 100*c*. The deflector 71 may form a passage space 100*e* configured to communicate with the defroster outlet 100*a*, the foot outlet 100*b*, and the face outlet 100*c*.

A defroster door 130 may be equipped between the defroster outlet 100*a* and the foot outlet 100*b*. The defroster door 130 may be rotational between a first position shown by the dotted line and a second position shown by the solid line. The defroster door 130 may be at a position between the first and second positions arbitrarily to divide the mixed airflow 131*f* into the defroster outlet 100*a* and the passage space 100*e* at a desired rate.

A foot door 140 may be equipped between the foot outlet 100*b* and the face outlet 100*c*. The foot door 140 may be rotational between a first position shown by the solid line and second position shown by the dotted line. As described later, the foot door 140 may be at a position between the first and second positions arbitrarily to divide the mixed airflow 131*f* passing through the passage space 100*e* into the foot outlet 100*b* and the face outlet 100*c* at a desired rate.

The defroster outlet 100*a*, the foot outlet 100*b*, and the face outlet 100*c*, may be divided with the partition 50 (FIG. 2) and separately formed in the first compartment 101 and the second compartment 102 (FIG. 2) for the driver's area and the passenger's area. The defroster door 130 and the foot door 140 may be provided to each of the first compartment 101 and the second compartment 102 and may be individually operated at different positions.

(DEF Mode)

FIG. 6 shows the HVAC 1 in a DEF mode. In the DEF mode, the defroster door 130 may open the defroster outlet 100*a* and may close the passage space 100*e*. In addition, the heater door 41 may be at an intermediate position to enable airflow to pass through the heater 20 and the heater passage 121. The position of the heater door 41 may be changed according to a desired temperature of the mixed airflow 131*f*.

As described above, the heater airflow 121*f* may partially pass through the tunnel passage 31*a* toward the inner wall 110 of the case 100, without interfering with the evaporator airflow 111*f*. The heater airflow 121*f* may collide against the inner wall 110 of the case 100 to be directed upward in the drawing toward the defroster outlet 100*a*. The evaporator airflow 111*f* may be partially deflected on the tunnel 31 to pass upward in the drawing toward the defroster outlet 100*a*. Thus, the heater airflow 121*f* and the evaporator airflow 111*f* may merge to form the mixed airflow 131*f* on the downstream of the tunnel 31 to move toward the defroster outlet 100*a*.

Figure 7:
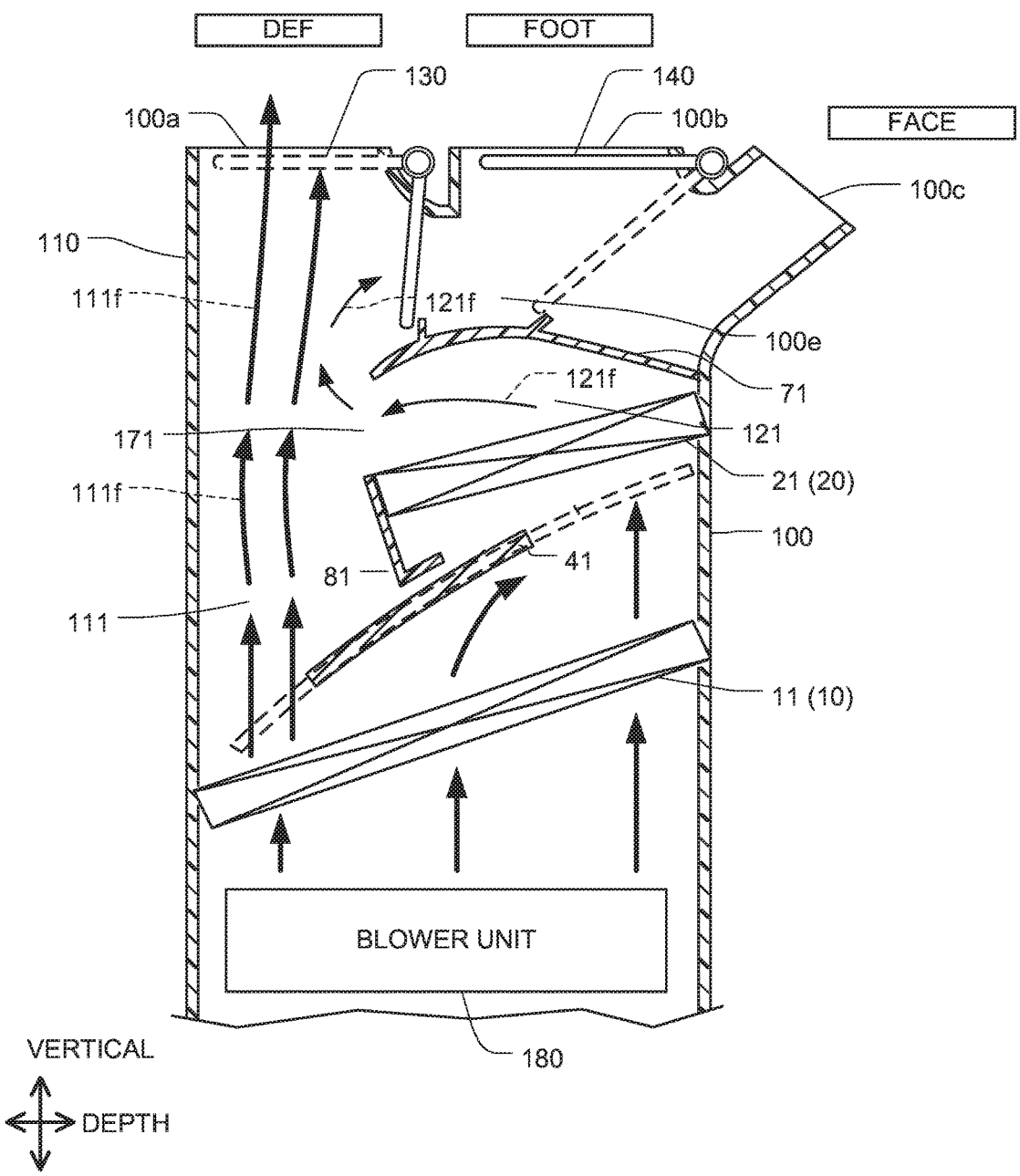
FIG. 7 a sectional view showing an air conditioner of a comparative example.

FIG. 7 shows a comparative example of an HVAC, which does not have the tunnel 31. In the comparative example, the heater airflow 121*f* may entirely flow into the evaporator passage 111 and may merge with the evaporator airflow 111*f*. The evaporator airflow 111*f* may pass linearly through the evaporator passage 111 and may form a laminar flow in which flow velocity may be high at the center. That is, the evaporator airflow 111*f* may have a high dynamic pressure at the center thrusting toward the defroster door 130. Therefore, when the heater airflow 121*f* moves out of the heater opening 171 to merge with the evaporator airflow 111*f*, the dynamic pressure of the evaporator airflow 111*f* may work on the heater airflow 121*f* to deflect the heater airflow 121*f* outward, before reaching the inner wall 110 of the case 100. Thus, the heater airflow 121*f* may be entrained with a surficial flow of the evaporator airflow 111*f*, before sufficiently merging with a center flow of the evaporator airflow 111*f*. Therefore, temperature distribution may occur in the mixed airflow 131*f*. Specifically, the mixed airflow 131*f* may be low in temperature on the side of the inner wall 110 of the case 100.

To the contrary, according to the present embodiment referring to FIG. 6, the tunnel 31 may conduct the part of the heater airflow 121*f* toward the inner wall 110. In this way, the tunnel 31 may enable the part of the heater airflow 121*f* to be mixed with the evaporator airflow 111*f* on the side of the inner wall 110. In addition, remaining heater airflow 121*f* may merge with the evaporator airflow 111*f* from the counter side of the inner wall 110 on the right side in the drawing.

The present configuration of the embodiment may facilitate to mix the heater airflow 121*f* and the evaporator airflow 111*f* evenly.

(FOOT Mode)

Figure 8:
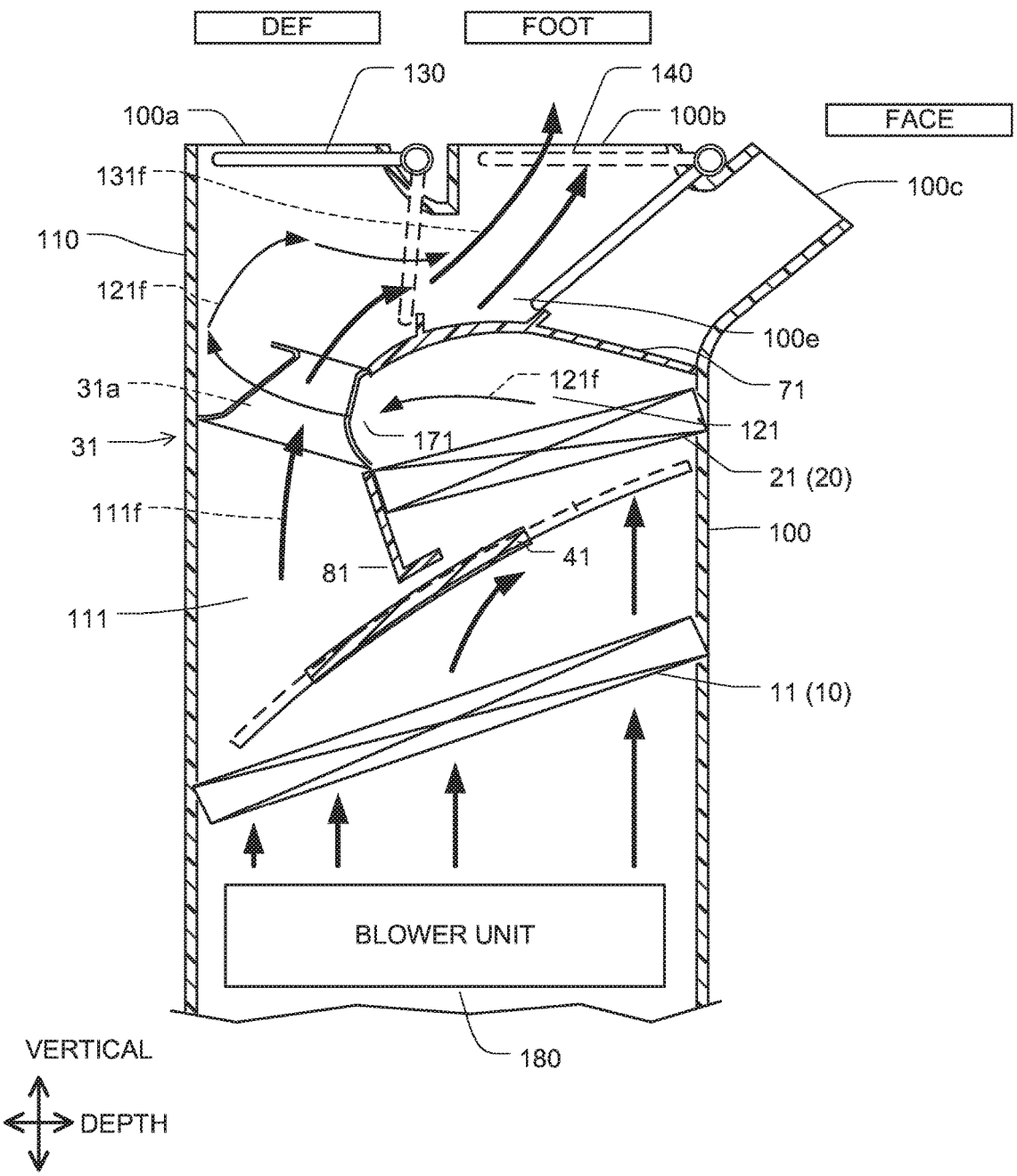
FIG. 8 a sectional view showing the air conditioner in a FOOT mode.

FIG. 8 shows the HVAC 1 in a FOOT mode. In the FOOT mode, the defroster door 130 may close the defroster outlet 100*a* and may open the passage space 100*e*. In addition, the foot door 140 may close the face outlet 100*c* and may open the foot outlet 100*b*. The heater door 41 may be at an intermediate position to enable airflow to pass through the heater 20 and the heater passage 121. The position of the heater door 41 may be changed according to a desired temperature of the mixed airflow 131*f*. In the FOOT mode, the heater airflow 121*f* after passing through the tunnel 31 and the evaporator airflow 111*f* may be mixed together to form the mixed airflow 131*f* on the downstream side of the tunnel 31 and the in the passage space 100*e*, and the mixed airflow 131*f* may move toward the foot outlet 100*b*.

(FOOT/DEF Mode)

In a FOOT/DEF mode, the defroster door 130 may be at an intermediate position between the first and second positions to open both the defroster outlet 100*a* partially and the passage space 100*e* partially. In addition, the foot door 140 may open the foot outlet 100*b* and may close the face outlet 100*c*. In the FOOT/DEF mode, the mixed airflow 131*f* on the downstream may move toward the defroster outlet 100*a* and the foot outlet 100*b*.

(FACE Mode)

Figure 9:
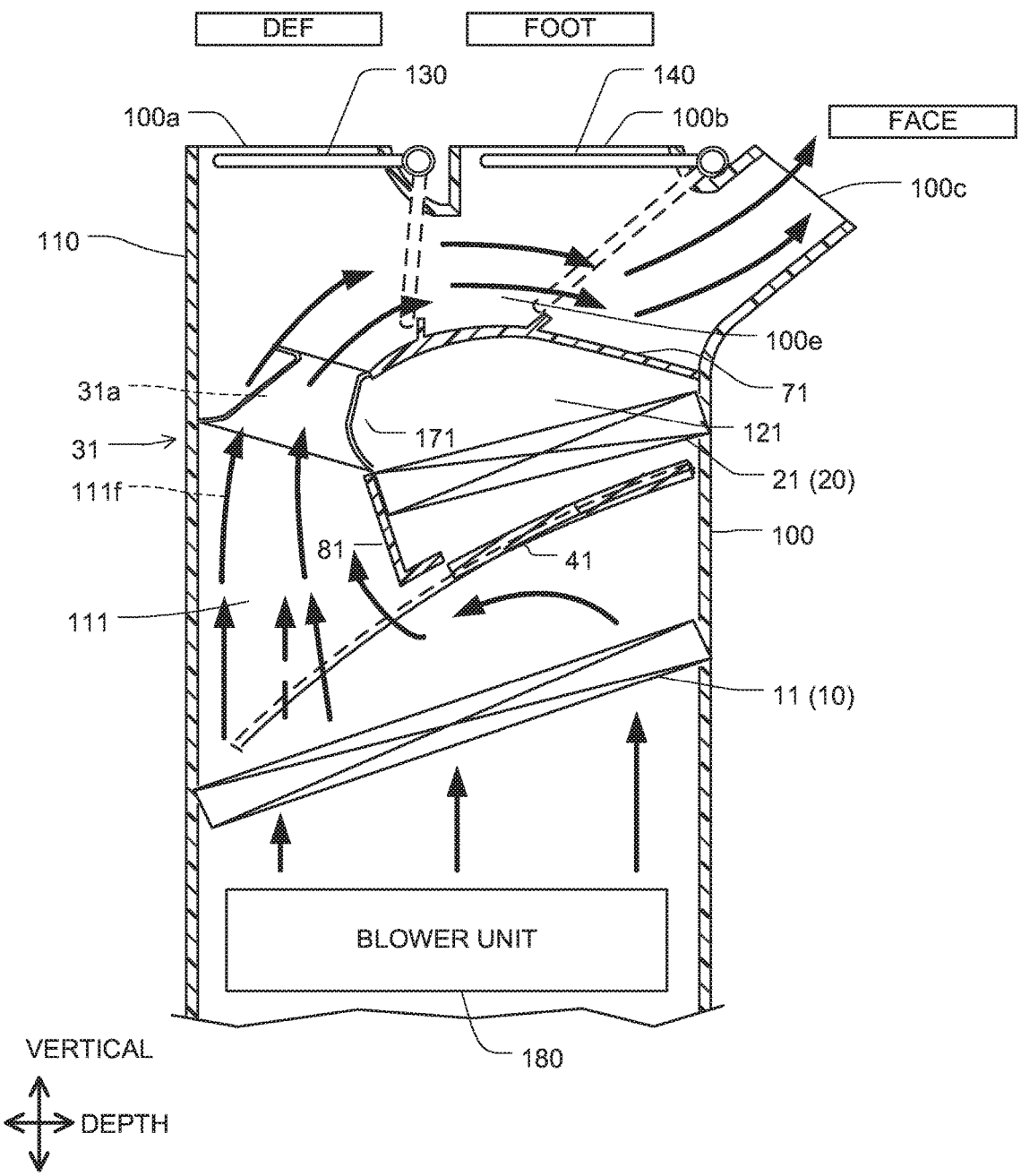
FIG. 9 a sectional view showing the air conditioner in a FACE mode.

FIG. 9 shows the HVAC 1 in a FACE mode. In the FACE mode, the defroster door 130 may close the defroster outlet 100*a* and may open the passage space 100*e*. In addition, the foot door 140 may close the foot outlet 100*b* and may open the face outlet 100*c*. The heater door 41 may be at a closed position to disable airflow to pass through the heater 20 and the heater passage 121. The position of the heater door 41 may be changed according to a desired temperature of the mixed airflow 131*f*. In the FACE mode, the evaporator airflow 111*f* may mainly move toward the face outlet 100*c* after passing over the tunnel 31.

(B/L Mode)

In a bi-level (B/L) mode, the defroster door 130 may close the defroster outlet 100*a* and may open the passage space 100*e*. In addition, the foot door 140 may be at an intermediate position between the first and second positions. In the B/L mode, the evaporator airflow 111*f* may mainly move from the passage space 100*e* toward both the foot outlet 100*b* partially and the face outlet 100*c* partially.

(Second Embodiment)

Figure 10:
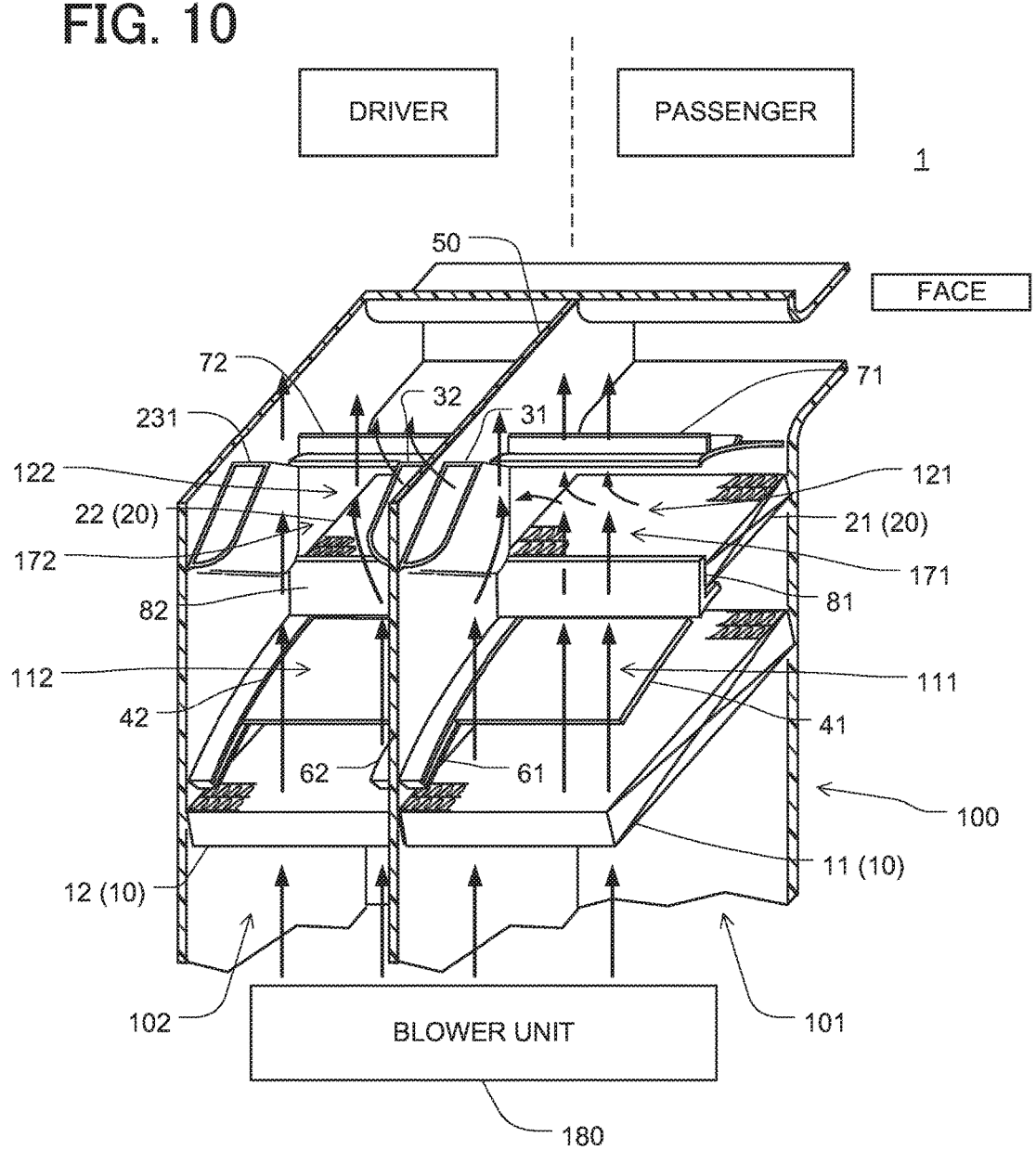
FIG. 10 is a perspective sectional view showing an air conditioner of a second embodiment.

As shown in FIG. 10, in the example, an inner wall of the case 100 may have a tunnel 231. The tunnel 231 may be equivalent to the tunnel 31 equipped on the partition 50. In the present example, two tunnels 231 and 31 may be formed in one passage.

(Other Embodiment)

The face outlet, the defroster outlet, and the foot outlet in the above embodiments may be arbitrarily replaced with each other. For example, the defroster outlet, the face outlet, and the foot outlet may be arranged in this order. The face outlet, the defroster outlet, and the foot outlet may be arranged in this order.

The first compartment and the second compartment of the HVAC may be directed separately to a front cabin and a rear cabin of the vehicle, respectively. In this case, airflow toward the front cabin or the rear cabin may be divided into one passenger (or driver) and the other passenger.

At least one tunnel may be formed on the partition and/or the inner wall of the case. That is, the tunnel may be omitted from one side or both sides of the partition, or from one side or both sides of the inner wall of the case.

In the above description, the wordings such as vertical, width, depth, upward, downward, rightward, and leftward may be examples and may not limit actual directions in the HVAC 1. The wordings related to the directions and the dimensions may be changed in dependence upon installation of the HVAC 1 in a vehicle.

For purposes of clarity, the same reference numbers will be used in the drawings to identify similar elements. As used herein, the phrase at least one of A, B, and C should be construed to mean a logical (A or B or C), using a non-exclusive logical or.

It should be appreciated that while the processes of the embodiments of the present disclosure have been described herein as including a specific sequence of steps, further alternative embodiments including various other sequences of these steps and/or additional steps not disclosed herein may be intended to be within the steps of the present disclosure.

While the present disclosure may have been described with reference to preferred embodiments thereof, it may be to be understood that the disclosure may be not limited to the preferred embodiments and constructions. The present disclosure may be intended to cover various modification and equivalent arrangements. In addition, while the various combinations and configurations, which may be preferred, other combinations and configurations, including more, less or only a single element, may be also within the spirit and scope of the present disclosure.

What is claimed is:

1. An air conditioner comprising:
a case;
an evaporator accommodated in the case;
a heater accommodated in the case; and
a tunnel in a tubular shape forming a tunnel passage, wherein
the case forms an evaporator passage and a heater passage,
the evaporator passage is located on a downstream side of the evaporator and extended without passing through the heater,
the heater passage is located on a downstream side of the heater, and
the tunnel extends from the heater passage through the evaporator passage toward an inner wall of the case, wherein
the tunnel has an upper wall, a lower wall, a top wall and a bottom wall, which are integrated to form the tunnel passage, the top wall bridges the upper wall with the lower wall, and the lower wall is more tilted to the inner wall than the upper wall is tilted to the inner wall, wherein
the lower wall is located upstream of the upper wall in the evaporator passage.

2. The air conditioner of claim 1, wherein:
the tunnel passage intersects with the evaporator passage, and
the tunnel isolates the tunnel passage from the evaporator passage.

3. The air conditioner of claim 2, wherein:
the tunnel is protruded into the evaporator passage.

4. The air conditioner of claim 3, wherein:
the tunnel is configured to divide air after passing through the heater into the tunnel passage and the evaporator passage.

5. The air conditioner of claim 4, wherein:
the tunnel is configured to cause air, which is after passing through the tunnel passage, to merge with air passing through the evaporator on a downstream side of the tunnel.

6. The air conditioner of claim 5, wherein:
the tunnel passage is configured to conduct air from the heater, without interfering with air flowing through the evaporator passage.

7. The air conditioner of claim 1, further comprising:
a partition partitioning the case into a first compartment and a second compartment, and
the tunnel is equipped to the partition.

8. The air conditioner of claim 1, further comprising:
a deflector located on a downstream side of the heater and configured to deflect airflow from the heater passage toward the tunnel.

9. The air conditioner of claim 8, further comprising:
a heater wall located on a downstream side of the heater and partitioning the heater passage from the evaporator passage.

10. The air conditioner of claim 9, wherein:
the heater wall and the deflector form a heater opening therebetween, and
the heater opening communicates the heater passage with both the tunnel passage and the evaporator passage.

11. The air conditioner of claim 10, wherein:
the tunnel has an inlet opposed to the heater opening.

12. The air conditioner of claim 11, wherein:
the tunnel has an outlet, which is inclined at an angle and is directed toward a downstream side of the evaporator passage.

13. The air conditioner of claim 1, further comprising:
a heater door movable along a rail and configured to control a quantity of air passing through the heater.

14. The air conditioner of claim 13, wherein:
the tunnel has a height, which is less than a height of the rail.

* * * * *